United States Patent [19]
Lowe

[11] 3,749,483
[45] July 31, 1973

[54] AUDIO-SENSITIVE DEVICES
[76] Inventor: Barrie Lowe, 8, Albert Gate Ct., 124, Knightsbridge, London, England
[22] Filed: Oct. 19, 1970
[21] Appl. No.: 81,951

[30] Foreign Application Priority Data
Oct. 20, 1969 Great Britain.................. 51,411/69

[52] U.S. Cl. .................................... 353/15, 84/464
[51] Int. Cl. ......................................... G03b 31/00
[58] Field of Search ................................. 353/15–19, 122; 84/464

[56] References Cited
UNITED STATES PATENTS
| | | | |
|---|---|---|---|
| 3,234,847 | 2/1966 | Williams | 353/15 |
| 2,292,172 | 8/1942 | Stokes | 84/464 |
| 2,216,260 | 10/1940 | Wetzel | 84/464 |
| 2,677,297 | 5/1954 | Wetzel | 84/464 |
| 3,215,022 | 11/1965 | Orgo | 84/464 |
| 3,163,078 | 12/1964 | Elliot | 84/464 |

Primary Examiner—Louis R. Prince
Assistant Examiner—A. J. Mirabito
Attorney—Ira Milton Jones

[57] ABSTRACT

Optical projection apparatus comprising an optical system having a light source, lens means, a screen on to which, in operation, light from the light source focussed by the lens means is projected to form an image and an aperture of variable size between the light source and the lens means; motor means for driving said aperture to vary the size thereof; a static switching controller for controlling current in an electrical circuit said current being employed to vary a parameter of the optical system thereby to vary the image formed on the screen; and electrical means for effecting switching of said controller in response to an electrical signal of frequencies corresponding with selected audio frequencies.

17 Claims, 7 Drawing Figures

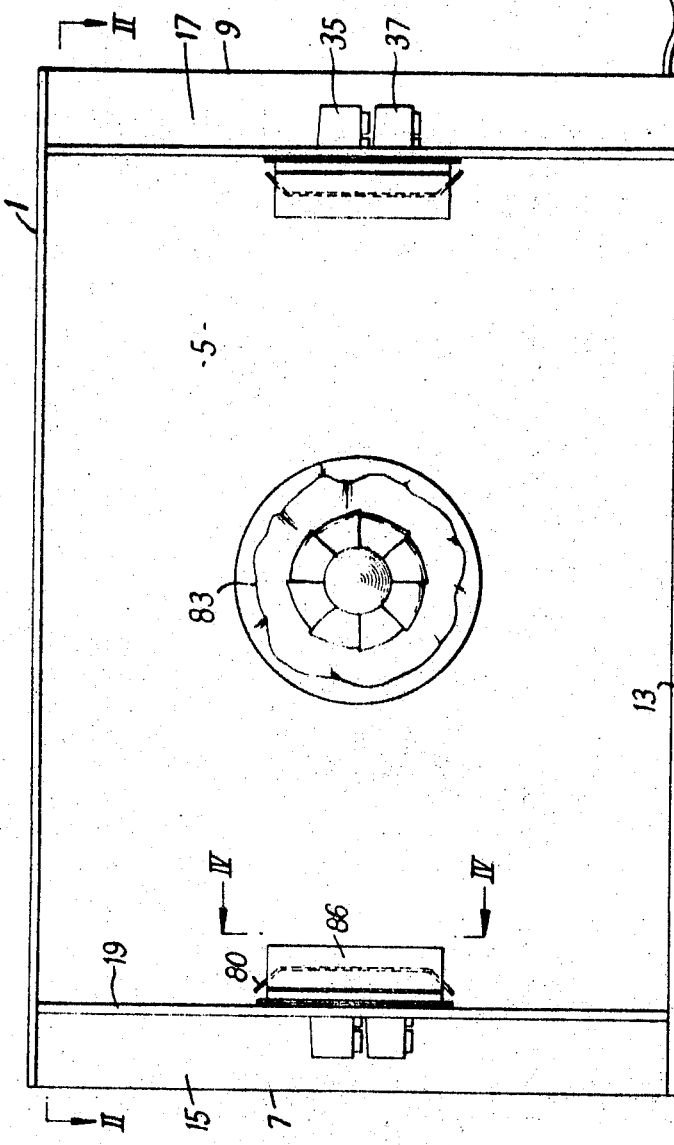
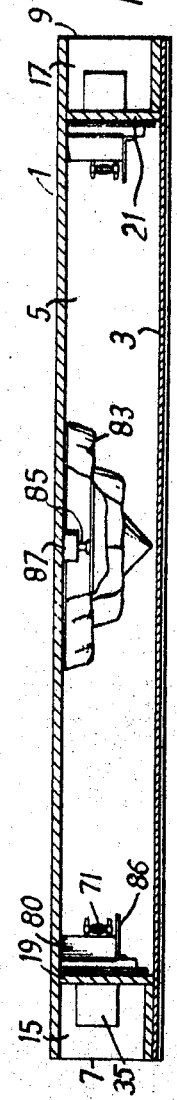

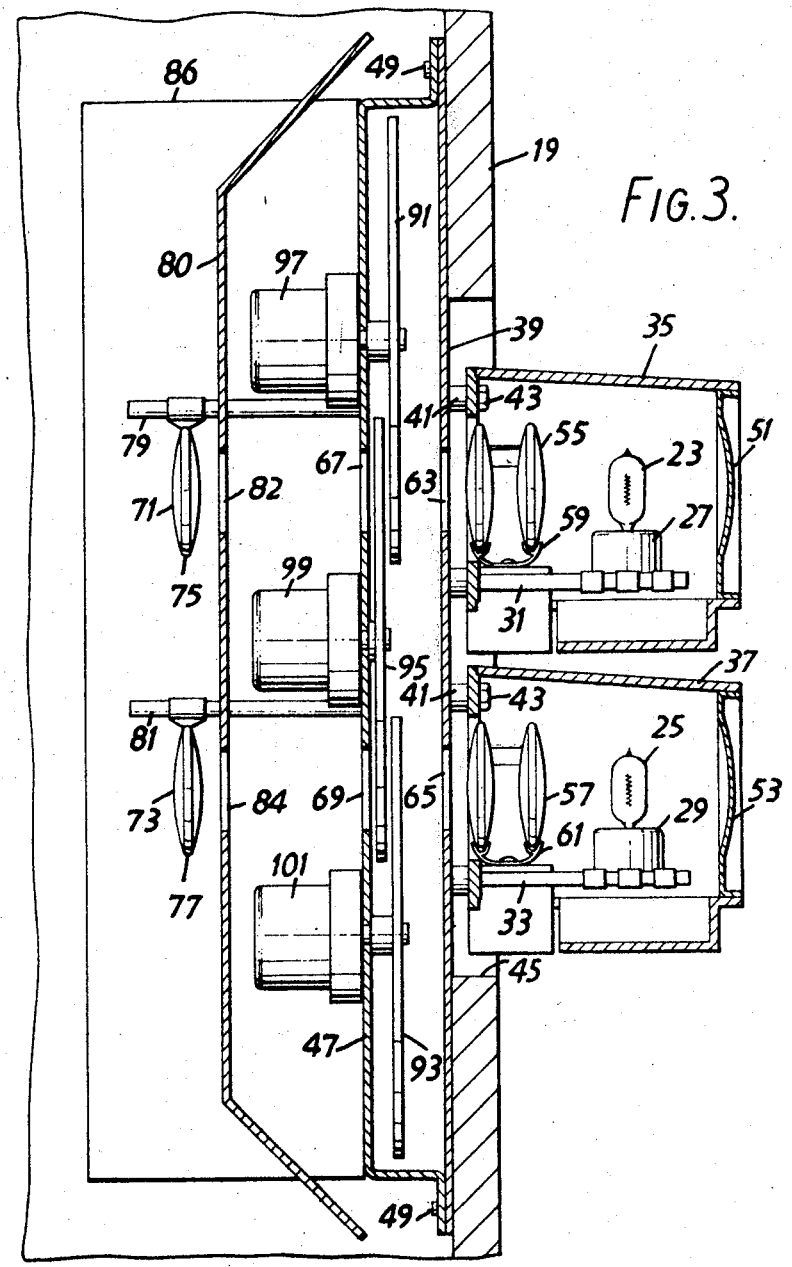

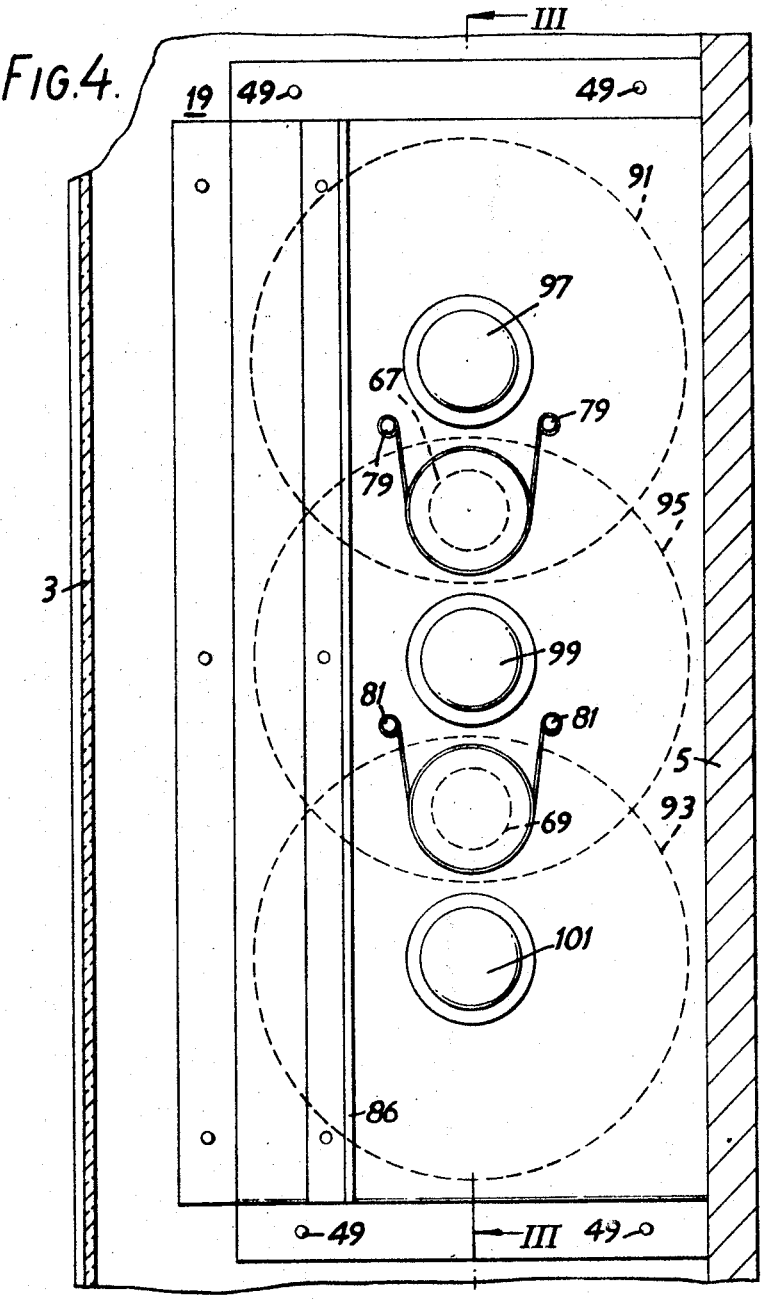

AUDIO-SENSITIVE DEVICES

This invention relates to optical projection apparatus. One object of the invention is to provide novel optical projection apparatus which is suitable for use in display lighting systems in which changing lighting effects are employed to create unique mobile artistic images for decorative or mood inducing purposes.

The present invention consists in optical projection apparatus comprising an optical system having a light source, lens means, a screen on to which, in operation, light from the light source focussed by the lens means is projected to form an image and an aperture of variable size between the light source and the lens means; motor means for driving said aperture to vary the size thereof; a static switching controller for controlling current in an electrical circuit said current being employed to vary a parameter of the optical system thereby to vary the image formed on the screen; and electrical means for effecting switching of said controller in response to an electrical signal of frequencies corresponding with selected audio frequencies.

Suitably, the static switching controller is employed to control the variation in the size of the aperture and/or the intensity of illumination of the light source.

Advantageously, between the light source and the lens means are disposed means for changing the colour of light projected on to the screen.

In one form of the invention a plurality of light sources is provided, each source having lens means and a variable sized aperture between the light source and the lens means and associated with each light source a static switching controller for controlling current in an electrical circuit, said current being employed to vary a parameter of the optical system of said light source thereby to vary the image formed on the screen, the switching of the static switching controllers being in response to respective electrical signals of different frequencies or ranges of frequencies corresponding with selected audio frequencies.

The invention will now be described, by way of example, with reference to the accompanying diagrammatic drawings, in which:

FIG. 1 is a side elevation of optical projection apparatus according to the invention;

FIG. 2 is a sectional plan view taken on the line II — II of FIG. 1,

Figure 5:
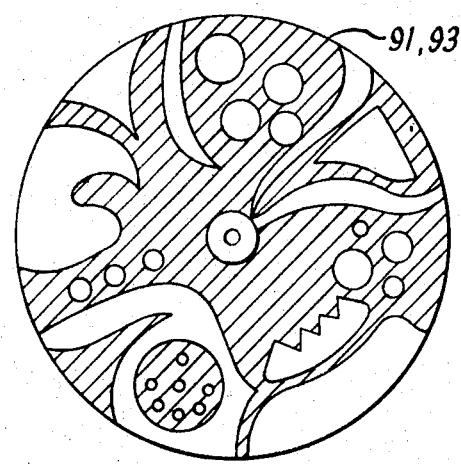
Figure 6:
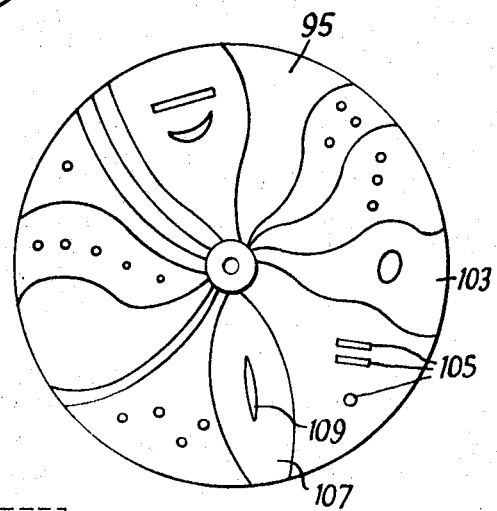
Figure 7:
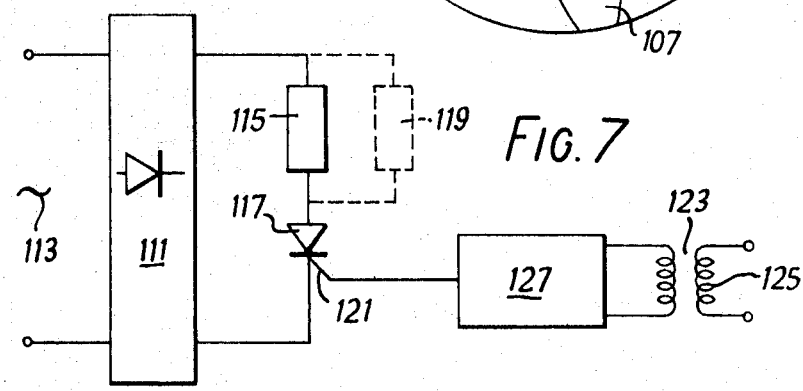

FIG. 3 is a sectional side elevation to a larger scale of certain parts of the apparatus of FIG. 1 and taken on the line III — III of FIG. 4, FIG. 4 is a view to a larger scale taken on the line IV — IV of FIG. 1, FIGS. 5 and 6 are elevational views of separate parts of the apparatus of the other figures, and, FIG. 7 is a diagram largely in block form of an electrical circuit employed in the apparatus illustrated in the preceding figures.

Referring to the drawings, optical projection apparatus in accordance with this invention comprises a rectangular housing 1 having upstanding front and rear walls 3 and 5, end walls 7 and 9 and top and bottom walls 11 and 13. The front wall 3 consists of a screen of translucent material. The screen is approximately 180 cm. by 120 cm. high and the depth between the walls 3 and 5 is approximately 30 cm.

At opposite ends of the housing 1 are formed upright elongated chambers 15 and 17 of which the chamber 15 is defined by side walls of the housing 1 and an upright partition 19 which extends between the screen 3 and rear wall 5 of the housing whilst the chamber 17 is defined by the side walls of the housing 1 and an upright partition 21 which extends parallel with the partition 19.

Mounted on each of the partitions 19 and 21 are parts of a projection system which comprises two light sources 23 and 25 in the form of 100 watt lamps. The light sources are carried in respective mountings 27, 29 supported on plates 31 and 33, which are secured in light-tight housings 35 and 37.

The housings 35 and 37 are mounted on a plate 39 by means of stud bolts 41 and nuts 43. The plate 39 overlies an opening 45 in the associated upright partition, as the case may be, 19 or 21, and is secured together with a bracket plate 47 to the upright partition by screws 49. The housings 35 and 37 at the ends thereof remote from the plate 39 are formed with reflectors 51, 53 which direct light from the lamps 23, 25 through condenser lenses 55, 57 supported in mountings 59, 61 carried on the plates 31, 33.

From the condenser lenses 55, 57 light is directed through holes 63, 65 in the plate 39 to respective apertures 67, 69 in the bracket plate 47. On the side of the apertures 67 and 69 opposite the plate 39 are respective lenses 71 and 73 carried in stirrups 75 and 77, the ends of which are slidably mounted on rods 79, 81 secured to the bracket plate 47.

Between the lenses 71, 73 and the aperture 67, 69 is a mask 80 which is formed with apertures 82 and 84 which are collinear with apertures 67 and 69. The mask 80 extends between the rear wall 5 and a light shield plate 86, secured to the partition, as the case may be, 19 or 21.

The lenses 71 and 73 converge light from the light source 23, 25 passing through the apertures 67 and 69 on to a generally dome shaped reflector 83 carried on a horizontally extending shaft 85 of an electric motor 87 mounted on rear wall 5 of the housing. The relector 83 is rotatably driven by the motor 87 and has an irregular reflecting surface so that light projected thereon by the light converging lenses 71 and 73 is scattered by the reflector, a large proportion of the light reflected by the reflector falling on the screen 3.

The apertures 67 and 69 are disposed in or close to the focal plane of the lenses 71 or 73. Between the aperturs 67, 69 and the plate 39 and located close to the apertures 67 and 69 are rotatable circular disc laminae 91, 93 and 95. The laminae 91, 93 and 95 are rotatably driven by motors 97, 99 and 101 which are mounted on the bracket plate 47 on the side of that plate opposite the laminae. The laminae 91, 93 and 95 are so located with respect to the apertures 67 and 69 that aperture 67 is overlapped by laminae 91 and 95 whilst aperture 69 is overlapped by laminae 93 and 95. As the laminae 91, 93 and 95 are rotated, therefore, they pass transversely across the apertures 67 and 69.

The circular disc laminae 91 and 93 are formed with adjacent sections of differential translucency, thus in FIG. 5 the wide areas represent transparent areas whilst the remaining areas are either opaque or limiting as regards the amount of light they allow to pass therethrough.

The circular disc 95 is illustrated in FIG. 6 and consists of a transparent disc on which are adhesively secured sections such as 103, 105, 107, 109 of coloured translucent material, for example material known by the trade mark CINEMOID.

It will be apparent that the disc laminae 91 and 93 together with the associated apertures 67 and 69 form a variable aperture, the size of which is determined by the amount of transparent area of the laminae which at any particular time is opposite the associated aperture 67 or 69. The laminae 91 and 93 not only control the amount of light passing through the apertures 67 and 69 but also the location in the apertures through which light is transmitted. The lamina 95 controls the colour of light transmitted through the apertures 67 and 69.

The optical system described has several parameters, the intensity of illumination of the lamps 23 and 25, the speed of rotation of the discs 91, 93 and 95, and the speed of rotation of the reflector 83.

FIG. 7 is a diagram of an electrical circuit employed to vary one of the parameters of the optical system thereby to vary the image formed on the screen. For the present purposes it will be assumed that the parameter being varied is the intensity of illumination of the lamps 23 and 25 in which case each of said lamps has a circuit such as is illustrated in FIG. 7 associated with it. The circuit consists of a full wave rectifier 111 connected across a source 113 of alternating current supply. The output of the rectifier has connected across it a load 115, in this instance the lamp 23 or 25 and a thyristor 117 disposed in series with the load. If desired further loads such as load 119 can be connected in parallel with the load 115. In this way a single circuit could control the intensity of illumination of more than one lamp or the speed of more than one electric motor. The frequency at which the thyristor 117 is rendered conducting depends upon the rate at which signals are applied to its gate electrode 121. The signal applied to the gate 121 is derived from a transformer 123, the primary coil which is connected in parallel with the speaker coil or coils of sound reproducing apparatus such as a record player or tape recorder. The signal developed in the secondary coil of the transformer 123 is supplied to a filter circuit 127 which both filters and amplifies and accordingly supplies selected frequencies duly amplified to the gate 121. It will be appreciated that the thyristor 117 is commutated at the end of each half circle of the full wave rectified supply. Accordingly if the filter circuit 127 passes signal frequencies to the gate 121, pulses of current pass through the load 115 and the rate at which pulsing of current through the load occurs depnds upon the frequency at which signals are supplied to the gate 121. It will be apparent therefore that the coloured light image projected on the screen 3 is related to the sounds being reproduced by the loud speakers of the tape recorder or record playing apparatus in parallel with the speakers of which is disposed the primary winding of the transformer 123.

When several circuits such as the circuit of FIG. 7 are employed they can be used to make one or more of the motor speeds dependent upon selected audio frequencies as well as or alternative to making the lamp illumination intensities dependent upon audio frequencies.

In FIG. 1 there is illustrated a control box 129 which includes seven rocker switches 131 disposed each in series with one of the electric motors of the apparatus. Also on the control box 129 are rotatable knobs 133 each associated with a circuit as illustrated in FIG. 7. The knob 133 enables the band width of frequencies passed by the filter circuit 127 to be varied.

Of the eight electrical circuits in which the band widths are controlled by the knobs 133, four are associated with the lamps 23 and 25 at each side of the apparatus and one each with the motors 97, 99, 101 and 87. Thus the user of the apparatus can either preset the controls as he desires or can operate the controls whilst the apparatus is working to vary the lighting effects achieved on the screen.

The unique mobile artistic images formed on the screen during operation of the apparatus are most decorative and suitable for inducing a relaxed mood in environments as varied as stores, restaurants, discotheques, hotel reception areas, doctors' and dentists' waiting rooms and so forth.

The apparatus may be provided in various sizes and even in different shapes.

I claim:

1. Optical projection apparatus comprising:
   A. a casing having a front wall substantially the whole of which is in the form of a flat screen of translucent material, said casing having a depth in its front-to-rear direction which is substantially less than the edgewise dimensions of the screen;
   B. a rotatable reflector mounted in said casing near the centre of said front wall and rotatable about an axis substantially normal to said front wall, said reflector having an irregular reflecting surface so shaped that light falling onto the reflector from a direction normal to said axis is diverted to directions along and diverging from said axis;
   C. first and second light source means disposed in the casing behind said front wall and adjacent to respective edges of said front wall on opposite sides of said rotatable reflector;
   D. first and second lens means co-operating respectively with said first and second light source means to direct light therefrom onto the rotatable reflector in beams that are behind and generally parallel to said front wall, the beams from the respective first and second light source means falling onto the rotatable reflector from generally opposite directions;
   E. means for rotating the reflector;
   F. movable means in the casing, interposed between each of said light source means and the reflector, for varying the amount or colour of the light from said light source means that arrives at the reflector; and
   G. at least two static switching controllers for varying the intensity of illumination of the first and second light source means in response to respective electrical signals of different frequencies corresponding to selected audio frequencies.

2. Optical projection apparatus as claimed in claim 1, in which said means for varying the amount of light directed onto the reflector comprises an aperture of variable size between the light source and lens means, and motor means for driving said aperture to vary the size thereof.

3. Apparatus as claimed in claim 2, wherein the variable sized aperture comprises a lamina movable transversely to the optical axis through the light source and lens means, the lamina being formed from sections, adjacent sections having differential translucency and the movement of the lamina causing the sections thereof progressively to pass across the optical axis.

4. Apparatus as claimed in claim 4, wherein the boundaries between adjacent sections of the lamina are irregularly shaped.

5. Apparatus as claimed in claim 4, wherein the lamina is a circular disc rotatable about an axis parallel with the optical axis through the light source and the lens means.

6. Apparatus as claimed in claim 3 wherein an electric motor is provided to effect movement of the lamina.

7. Apparatus as claimed in claim 6, wherein the excitation current of the electric motor is controlled by a static switching controller, the switching of which responds to an electrical signal of frequency corresponding with selected audio frequencies.

8. Apparatus as claimed in claim 1, wherein the means for changing the colour of light projected on to the screen comprise a lamina disposed between the light source and the lens means and movable transversely to the optical axis through the source and the lens means, the lamina being formed from translucent sections of different colours the movement of the lamina causing the different coloured sections of the lamina to pass successively across the optical axis.

9. Apparatus as claimed in claim 8, wherein the boundaries between adjacent sections of the lamina of coloured sections are irregularly shaped.

10. Apparatus as claimed in claim 8, wherein an electric motor is provided for effecting movement of the lamina of coloured sections.

11. Apparatus as claimed in claim 10, wherein a static switching controller is provided for controlling the excitation current of the motor for effecting movement of the lamina of coloured sections, the static switching controller effecting switching of the excitation current in response to an electrical signal of frequencies corresponding with selected audio frequencies.

12. Apparatus as claimed in claim 1, wherein the lamina of coloured sections is a disc rotatable about an axis parallel with the optical axis of the light source and the lens means.

13. Apparatus as claimed in claim 1, wherein the reflector is generally dome-shaped and is rotatable about its axis of symmetry, said axis being disposed perpendicular to the plane of the screen, and electric motor means are provided for driving the reflector.

14. Apparatus as claimed in claim 13, wherein the motor means which drive the reflector are adapted to be driven at uniform speed.

15. Apparatus as claimed in claim 13, wherein the excitation current of the motor means is controlled by a static switching controller, the switching of which is responsive to an electrical signal of frequencies corresponding with selected audio frequencies.

16. Apparatus as claimed in claim 1, wherein the means for changing the colour of light projected on the screen are disposed close to a variable sized aperture which is at or near the focal plane of the lens means.

17. Apparatus as claimed in claim 1, wherein means are provided for manually varying a parameter of the optical system thereby to vary the image formed on the screen.

* * * * *

UNITED STATES PATENT OFFICE
CERTIFICATE OF CORRECTION

Patent No. 3,749,483   Dated July 31, 1973

Inventor(s) Barrie Lowe

It is certified that error appears in the above-identified patent and that said Letters Patent are hereby corrected as shown below:

Column 2, Line 40: "relector" should read --reflector--

Column 2, Line 48: "aperturs" should read --apertures--

Column 3, Line 49: "depnds" should read --depends--

Column 3, Line 37: "coil which" should read --coil of which--

Column 5, Line 1 (line 1 of claim 4): "claim 4" should read --claim 3--

Column 6, Line 7 (line 1 of claim 12): "claim 1" should read --claim 11--

Signed and sealed this 1st day of January 1974.

(SEAL)
Attest:

EDWARD M. FLETCHER, JR.  RENE D. TEGTMEYER
Attesting Officer        Acting Commissioner of Patents